(12) United States Patent
Hasler

(10) Patent No.: US 8,259,480 B2
(45) Date of Patent: Sep. 4, 2012

(54) ARRANGEMENT FOR EXCHANGING POWER

(75) Inventor: Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/330,337

(22) Filed: Dec. 19, 2011

(65) Prior Publication Data

US 2012/0092906 A1 Apr. 19, 2012

Related U.S. Application Data

(63) Continuation of application No. PCT/EP2009/057625, filed on Jun. 18, 2009.

(51) Int. Cl.
*H02M 1/12* (2006.01)
(52) U.S. Cl. ......................... 363/137; 318/801
(58) Field of Classification Search .................. 363/34, 363/37, 39, 41–46, 65, 71, 136–138; 318/798–808; 307/107, 227, 228
See application file for complete search history.

(56) References Cited

U.S. PATENT DOCUMENTS

| 5,532,575 | A | 7/1996 | Ainsworth et al. | |
|---|---|---|---|---|
| RE37,126 | E * | 4/2001 | Peng et al. | 363/137 |
| 6,954,366 | B2 * | 10/2005 | Lai et al. | 363/71 |
| 6,969,967 | B2 * | 11/2005 | Su | 318/801 |
| 7,940,537 | B2 * | 5/2011 | Abolhassani et al. | 363/65 |
| 2005/0035815 | A1 | 2/2005 | Cheng et al. | |

OTHER PUBLICATIONS

Peng, et al.; "A Multilevel Voltage-Source inverter with Separate DC Sources for Static Var Generation"; 1995 IEEE, pp. 2541-2548.
Hao, et al.; "Comparison of Control Strategies for Active Power Filter in Three-Phase Four-Wire Systems" Nov. 2, 2004 Industrial Electronics Society, pp. 1429-1434.
International Preliminary Report on Patentability; Application No. PCT/EP2009/057625; Issued: Sep. 20, 2011; 16 pages.
International Search Report and Written Opinion of the International Searching Authority; Application No. PCT/EP2009/057625; Issued: Feb. 11, 2010; Mailing Date: Feb. 23, 2010; pp. 1-14.
Dixon, et al.; "Reactive Power Compensation Technologies: State-of-the-Art Review"; Proceedings of the IEEE, IEEE. New York, US, vol. 93, No. 12, Dec. 1, 2005; pp. 2144-2164.

* cited by examiner

*Primary Examiner* — Rajnikant Patel
(74) *Attorney, Agent, or Firm* — St. Onge Steward Johnston & Reens LLC

(57) ABSTRACT

An arrangement for exchanging power with a three-phase electric power network comprises a Voltage Source Converter having three phase legs with each a series connection of switching cells. The three phase legs are interconnected by forming a delta-connection. The arrangement also includes a control unit configured to calculate a value for amplitude and phase position for a zero-sequence current for which, when circulated in the delta-connection circuit of the three phase legs, the balance of the total direct voltage of each of the three phase legs with respect to the other two phase legs is restored will there be an unbalance and control the semiconductor devices of switching cells of the phase legs to add such a zero-sequence current to the currents of each phase leg of the converter.

16 Claims, 2 Drawing Sheets

ARRANGEMENT FOR EXCHANGING POWER

CROSS-REFERENCE TO RELATED APPLICATIONS

The present application is a continuation of pending International patent application PCT/EP2009/057625 filed on Jun. 18, 2009 which designates the United States, the content of which is incorporated herein by reference.

FIELD OF THE INVENTION

The present invention relates to the technical field of exchanging power with a three-phase electric power network with different aims, such as for obtaining reactive power compensation, stabilize the electric power network and reduce disturbances therein, such as reducing harmonics in the network generated by a load connected thereto.

Compensation of reactive power flows in electric power networks conventionally occurs, inter alia, by connection of reactive impedance elements in the form of inductors and capacitors in shunt connection to the power network. By connecting a semiconductor switch in series with such an inductor the current through the inductor may be controlled and hence also the exchange of reactive power with said network. By connecting a semiconductor switch in series with such a capacitor and control thereof reactive power supply to the power network may be controlled in steps. Capacitors connected in shunt connection are used primarily in industrial networks to compensate for reactive power consumption in for example large asynchronous motors. Another application of such an arrangement is in connection with loads with a greatly varying reactive power consumption, such as in industrial arc furnaces, where instability with respect to power transmitted through the different phases of the network may occur.

BACKGROUND OF THE INVENTION

The present invention relates more specifically to an arrangement for exchanging power in shunt connection, with a three-phase electric power network, said arrangement comprising:

a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding terminals of adjacent switching cells for forming said series connection of switching cells, in which the three phase legs of the Voltage Source Converter are interconnected by forming a delta-connection, means configured to detect electrical conditions of said three-phase electric power network and of said three phase legs of the Voltage Source Converter, a control unit configured to control said semiconductor devices of said semiconductor assemblies of each switching cell and by that each switching cell dependent upon information received from said detecting means to deliver a voltage across the terminals of each said switching cell being zero, +U or −U, in which U is the voltage across said capacitor, for together with other switching cells of the phase leg deliver a voltage pulse being the sum of the voltages so delivered by each switching cell.

Such an arrangement is already known through for example U.S. Pat. No. 5,532,575 and the article "A Multilevel Voltage-Source inverter with Separate DC Sources for Static Var Generation", 1995 IEEE, pages 2541-2548. An advantage of utilizing a Voltage Source Converter of this type in an arrangement for exchanging power with a three-phase electric power network is that already at a comparatively low number of such switching cells connected in series a comparatively high number of different levels of said voltage pulse delivered by the converter may be obtained, so that a said voltage with fundamental frequency having a shape being very close to a sinusoidal voltage may be obtained already without any smoothing filters. Furthermore, this may be obtained already by means of substantially lower switching frequencies than used in two or three level Voltage Source Converters. Furthermore, this makes it possible to obtain substantially lower losses and also reduces problems of filtering and harmonic currents and radio interferences, so that equipment therefor may be less costly. This altogether results in both a better performance of the arrangement and saving of costs with respect to such arrangements having converters with no energy storing capacitors built in into the switching cells.

It is of importance for reliable and efficient operation of such an arrangement that there is a balance of the total direct voltage of each of said three phase legs of the converter with respect to the other two phase legs. However, energy may be transferred between the phase legs of the converter and/or the electric power network and the converter. Such an unbalance of total direct voltages of the phase legs may be caused by faults in the control of the converter or surrounding equipment or by disturbances in the electric power network, which has not yet been compensated. It is of importance to restore the balance of the mutual total direct voltage of the phase legs of the converter in a reliable and efficient way and without causing any further disturbances.

SUMMARY OF THE INVENTION

The object of the present invention is to provide an arrangement of the type disclosed above addressing the above problem.

This object is according to the invention obtained by providing such an arrangement in which said control unit is configured, upon receipt of information from said detecting means of an unbalance of the total direct voltage of each of said three phase legs with respect to the other two phase legs, to calculate a value for amplitude and phase position for a zero-sequence current for which, when circulated in the delta-connection circuit of said three phase legs, the balance of the total direct voltage of each of said three phase legs with respect to the other two phase legs is restored and to control the semiconductor devices of said switching cells of the phase legs to add such a zero-sequence current to the currents of each phase leg of the converter.

By in this way adding a zero-sequence current to the current reference of the converter for the control of the semiconductor devices of the switching cells the balance of the total direct voltage of each of said three phase legs with respect to the other two phase legs may be restored purely by a zero-sequence current circulating in the three phase legs of the converter connected in delta without any additional current exchange between the converter and the electrical power network which could cause disturbance or other influence upon the electric power network. Accordingly, the restoration of said mutual total direct voltage of the three phase legs of the converter and by that the energy of these phase legs will in an arrangement according to the present invention be totally independent of the conditions prevailing in said network and leaving this totally unaffected by the energy restoring procedure.

According to an embodiment of the invention said control unit is configured to carry out said calculation of said zero-sequence current by utilizing a definition of the differential mode of said total direct voltages of said three phase legs A, B, C as a vector being as follows:

$$\vec{I}_{DC,Unb} = (2U_{DC,A} - U_{DC,B} - U_{DC,C})/3 + j*(U_{DC,B} - U_{DC,C})/\sqrt{3}$$

to calculate a zero-sequence current reference $\vec{I}_0$ to be added to a current reference for the control of said semiconductor devices of said switching cells as $\vec{I}_0 = \vec{I}_{DC,Unb} * e^{j\omega t}$, $U_{DC,A}$, $U_{DC,Bc}$, $U_{DC,C}$ being said total direct voltage of said phase legs A, B and C, respectively. Thus, the zero-sequence current reference to be added to the converter current reference for obtaining restoration of energy balance of the phase legs of the converter by a circulating zero-sequence current may be calculated in this way.

According to another embodiment of the invention said control unit is further configured, upon receipt of information from said detecting means causing a need to generate a negative-sequence current, to use this information when calculating a value for amplitude and phase position for said zero-sequence current, for which, when circulated in the delta-connection circuit of said three phase legs upon generation of said negative-sequence current, the resulting energy stored in said energy storing capacitors in each said phase leg will be constant in case of a said balance and to control the semiconductor devices of said switching cells of the phase legs to add such zero-sequence current to the currents of each phase leg of the converter. Instabilities in said power network, for instance due to great variations in the power consumption of an electric arc furnace connected thereto or flicker, may in this way be compensated by creating a negative-sequence current moving power from one of the phases to the other by just carrying out such calculation and control of semiconductor devices of the switching cells for the negative-sequence current desired to be generated. The zero-sequence current reference added to the converter current reference will ensure that the negative-sequence current desired may be created without resulting in any change of the energy stored in the capacitors in each phase should there be a balance of said energy in the phases and otherwise ensure that such energy balance will be restored.

According to another embodiment of the invention each phase leg of the Voltage Source Converter has a reactive impedance element connected in series therewith for influencing the flow of reactive power between the arrangement and said network, and this reactive impedance element comprises according to another embodiment of the invention a capacitor and according to a further embodiment of the invention an inductor for reactive power generation and consumption of reactive power, respectively.

According to another embodiment of the invention the number of switching cells of said series connection of switching cells in each phase leg of the Voltage Source Converter is $\geq 4$, $\geq 8$ or $\geq 12$. Although a cost saving of an arrangement of this type is obtained by the reduced number of switching cells connected in series required, the use of a converter of this type is particularly interesting when the number of switching cells in said series connection is rather high resulting in a high number of possible levels of the voltage pulses delivered by the converter.

According to another embodiment of the invention said semi-conductor devices of said semiconductor assemblies are IGBTs (Insulated Gate Bipolar Transistor), IGCTs (Integrated Gate Commutated Thyristor) or GTOs (Gate Turn-Off thyristor). These are suitable semiconductor devices for such converters, although other semiconductor devices of turn-off type are also conceivable.

According to another embodiment of the invention said Voltage Source Converter has a capacity to together with said reactive impedance element connected in series therewith generate a voltage with a fundamental frequency being equal to the fundamental frequency of the voltage of the respective phase of the electric power network with an amplitude of 20 kV-500 kV, preferably 30 kV-200 kV. Such an arrangement will be suitable for exchanging power with for instance a high-voltage transmission line typically carrying a voltage of 132-500 kV or a power network feeding an industrial arc furnace with a fundamental voltage of 36 kV.

The present invention also relates to a method of restoring a balance of the total direct voltage of each of three phase legs of a Voltage Source Converter with respect to the other two phase legs in an arrangement for exchanging power, in shunt connection, with a three-phase electric power network according to the appended independent method claim. The advantages and advantageous features of such a method and of the methods according to the embodiments of the invention defined in the enclosed dependent method claims appear clearly from the above discussion of the different embodiments of an arrangement according to the invention.

The invention also relates to a use of an arrangement according to the invention for exchanging power with a three-phase electric power network, in which preferable such uses are for exchanging power with a power network feeding an industrial arc furnace and with a three-phase electric power network in the form of a high-voltage transmission line.

Further advantages as well as advantageous features of the invention will appear from the following description.

BRIEF DESCRIPTION OF THE DRAWINGS

With reference to the appended drawings, below follows a specific description of embodiments of the invention cited as examples.

DETAILED DESCRIPTION OF THE INVENTION

Figure 1:
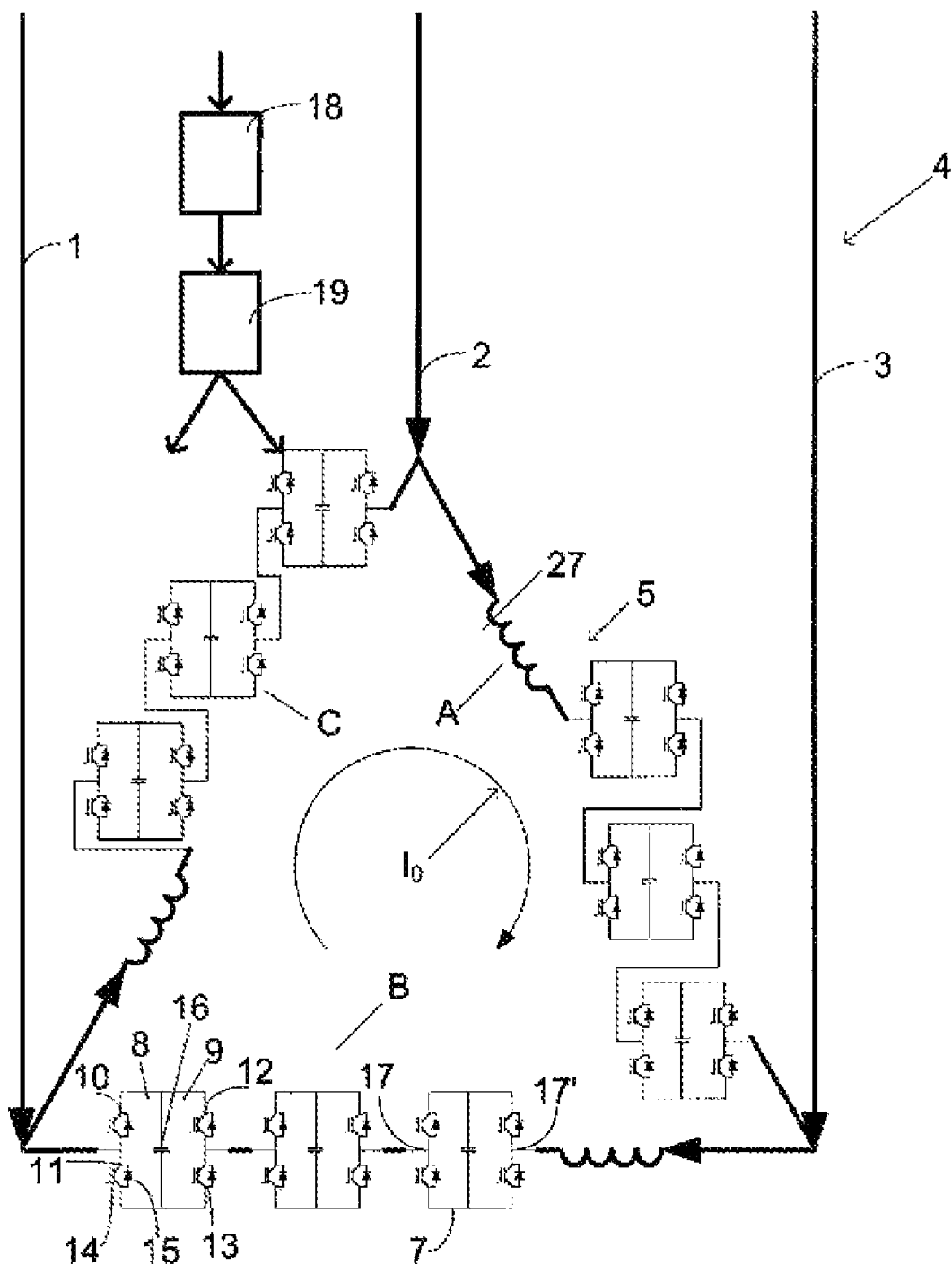
FIG. 1 is a very simplified view showing the general structure of an arrangement according to a first embodiment of the invention.

FIG. 1 schematically illustrates the general structure of an arrangement according to a first embodiment of the invention for exchanging power, in shunt connection, with a three-phase electric power network of any conceivable type and here indicated only by the lines 1-3 for connecting the arrangement to such a network. This network may for instance be a power network feeding an industrial arc furnace or any other equipment typically operating with a voltage of 36 kV. If the arrangement is to be connected to a network in the form of a high-voltage transmission line, which typically carries a much higher voltage, such as in the order of 132-500 kV, the arrangement is to be connected thereto through a transformer not shown in FIG. 1.

The arrangement 4 comprises a Voltage Source Converter 5 having three phase legs A, B and C with each a series connection of switching cells 7, of which only three are shown for the sake of simplicity of the drawing, but the number thereof may be any conceivable and is normally in the order of 10.

Each switching cell has the form of a so called H-bridge, comprising two switching elements 8, 9 connected in parallel and each having at least two semiconductor assemblies 10-13 connected in series and having each a semiconductor device 14 of turn-off type, such as for instance an IGBT, and a rectifying element 15, such as a free-wheeling diode, connected in anti-parallel therewith. Each switching cell further comprises at least one energy storing capacitor 16 having a voltage across the terminals thereof of U and connected in parallel with the switching elements. Midpoints 17, 17' between semiconductor assemblies of each switching element form terminals of the switching cell for connection to corresponding terminals of adjacent switching cells for forming a series connection of switching cells. Thus, each phase leg of the converter is formed by a so-called chain-link of H-bridge cells. The three phase legs A-C of the converter are interconnected by forming a delta-connection.

A means 18 configured to detect electrical conditions of a said three-phase electric power network and of said three phase legs of the Voltage Source Converter is indicated at 18. Such conditions may be amplitudes and phase positions of currents and voltages in the three phases, through which also disturbances and harmonics may be discovered. With respect to said three phase legs of the Voltage Source Converter such conditions may be an unbalance of the total direct voltage of each of said three phase legs with respect to the other two phase legs. The detecting means 18 is configured to send information about said electrical conditions further to a control unit 19, which is configured to control the semiconductor devices of the switching assemblies of each switching cell and by that each switching cell dependent upon information received from the detecting means 18 to deliver a voltage across the terminals of each said switching cell being zero, +U or −U, in which U is the voltage across the capacitor 16 of the switching cell, for together with other switching cells of the respective phase leg A-C deliver a voltage pulse being the sum of the voltages so delivered by each switching cell.

More exactly, the control unit 19 is configured to control the switching cells of the Voltage Source Converter in the following way upon receipt of information from said detecting means 18 of an unbalance of the total direct voltage of each said three phase legs with respect to the other two phase legs. The control unit 19 is then configured to calculate a value for amplitude and phase position of a zero-sequence current $I_0$ for which, when circulated in the delta-connection circuit of said three phase legs, the balance of the total direct voltage of each of said three phase legs with respect to the other two phase legs is restored and to control the semiconductor devices of the switching cells of the phase legs to add such a zero-sequence current to the currents of each phase leg of the converter. This means that the energy balance between the three phase legs may be restored by circulating said zero-sequence current in the delta-connection without any influence whatsoever on the electric power network.

More exactly, the control unit 19 is configured to carry out said calculation of said zero-sequence current by utilizing a definition of the differential mode of said total direct voltages of said three phase legs A, B, C as a vector being as follows:

$$\vec{I}_{DC,Unb} = (2U_{DC,A} - U_{DC,B} - U_{DC,C})/3 + j*(U_{DC,B} - U_{DC,C})/\sqrt{3}$$

to calculate a zero-sequence current reference $\vec{I}_0$ to be added to a current reference for the control of said semiconductor devices of said switching cells as $\vec{I}_0 = \vec{I}_{DC,Unb} * e^{j\omega t}$, $U_{DC,A}$, $U_{DC,Bc}$, $U_{DC,C}$ being said total direct voltage of said phase legs A, B and C, respectively.

Furthermore, the control unit 19 is further configured, upon receipt of information from the detecting means 18 causing a need to generate a negative-sequence current, which may be the case if an unbalance in the electric power network due to disturbances therein is to be compensated, to use this information when calculating a value for amplitude and phase position for said zero-sequence current, for which, when circulated in the delta connection circuit of said three phase legs upon generation of said negative-sequence current, the resulting energy stored in said energy storing capacitors in each said phase leg will be constant in the case of a said balance and to control the semiconductor devices of said switching cells of the phase legs to add such zero-sequence current to the currents of each phase leg of the converter. Thus, for a certain such negative-sequence current there will be a zero-sequence current which when added to the currents in the respective phase will result in quadrature of the current to the voltage in each phase and by that no discharging or charging of the capacitors. This comprises of course also a control by adding a zero-sequence current reference which will restore an unbalance when present. Furthermore, the control unit may be configured to obtain an increase of the current overload capability of the converter by adding a third harmonic current to the current reference when controlling said semiconductor devices to decrease the peak current. The third harmonic is of zero-sequence type and will be kept in the delta-connection. The amplitude and the phase of the added zero-sequence component are based on the highest converter phase current.

Figure 2:
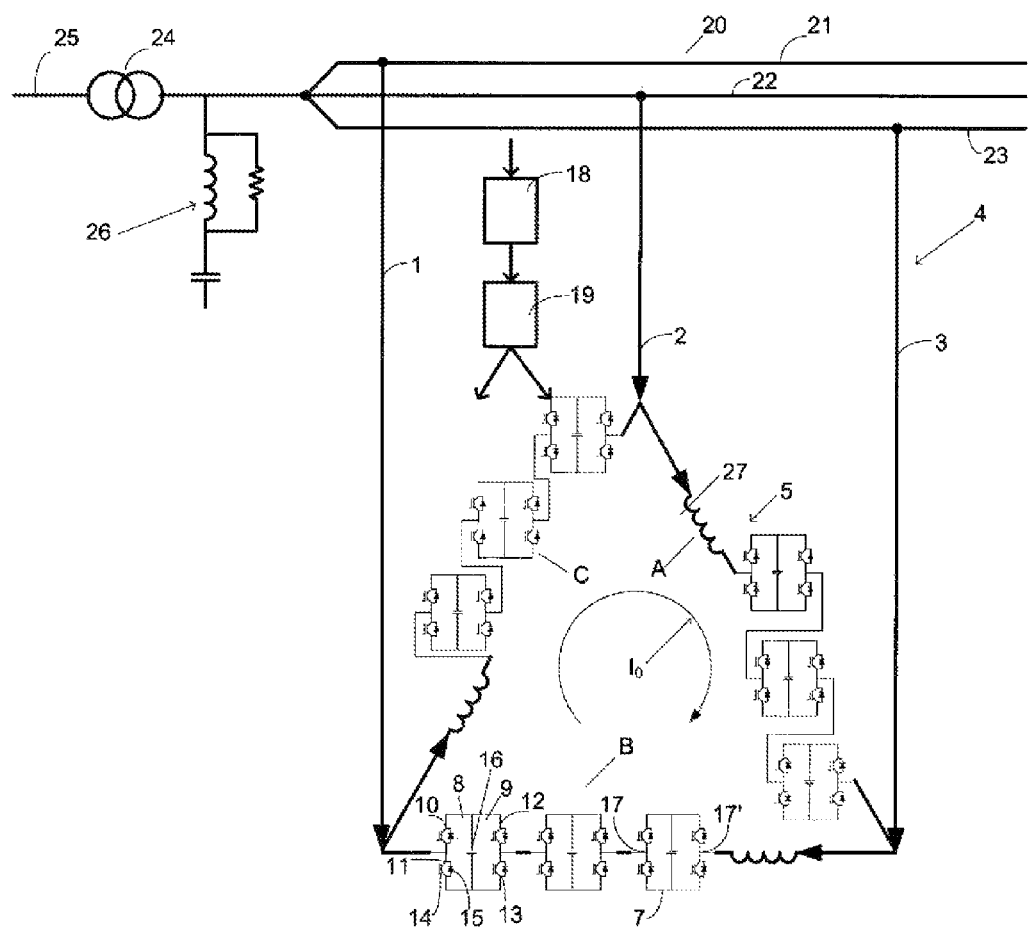
FIG. 2 is a view similar to FIG. 1 of an arrangement according to a second embodiment of the invention.
Figure 1:
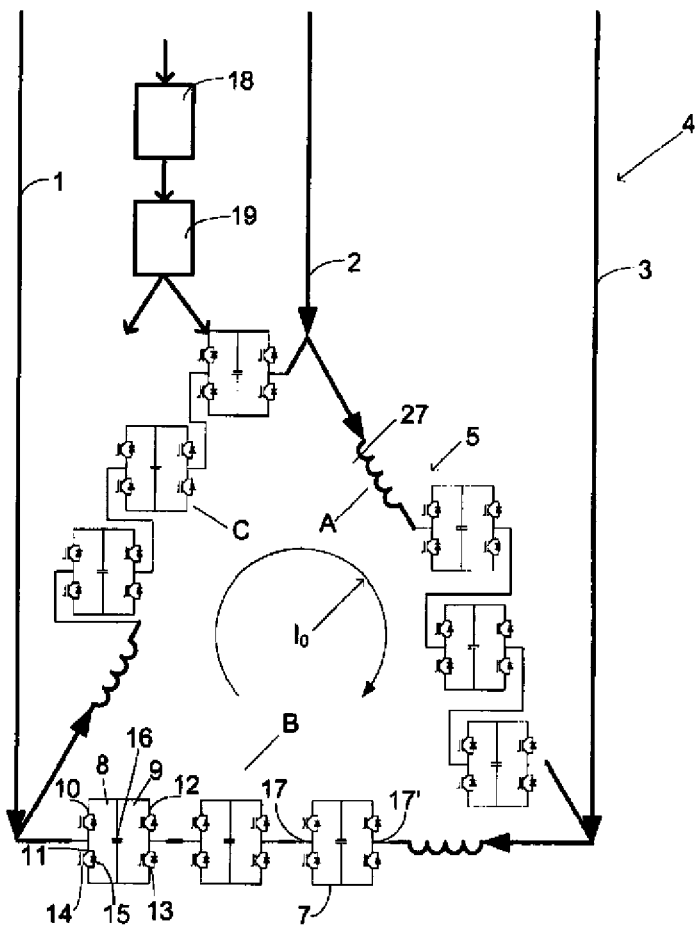
Figure 2:
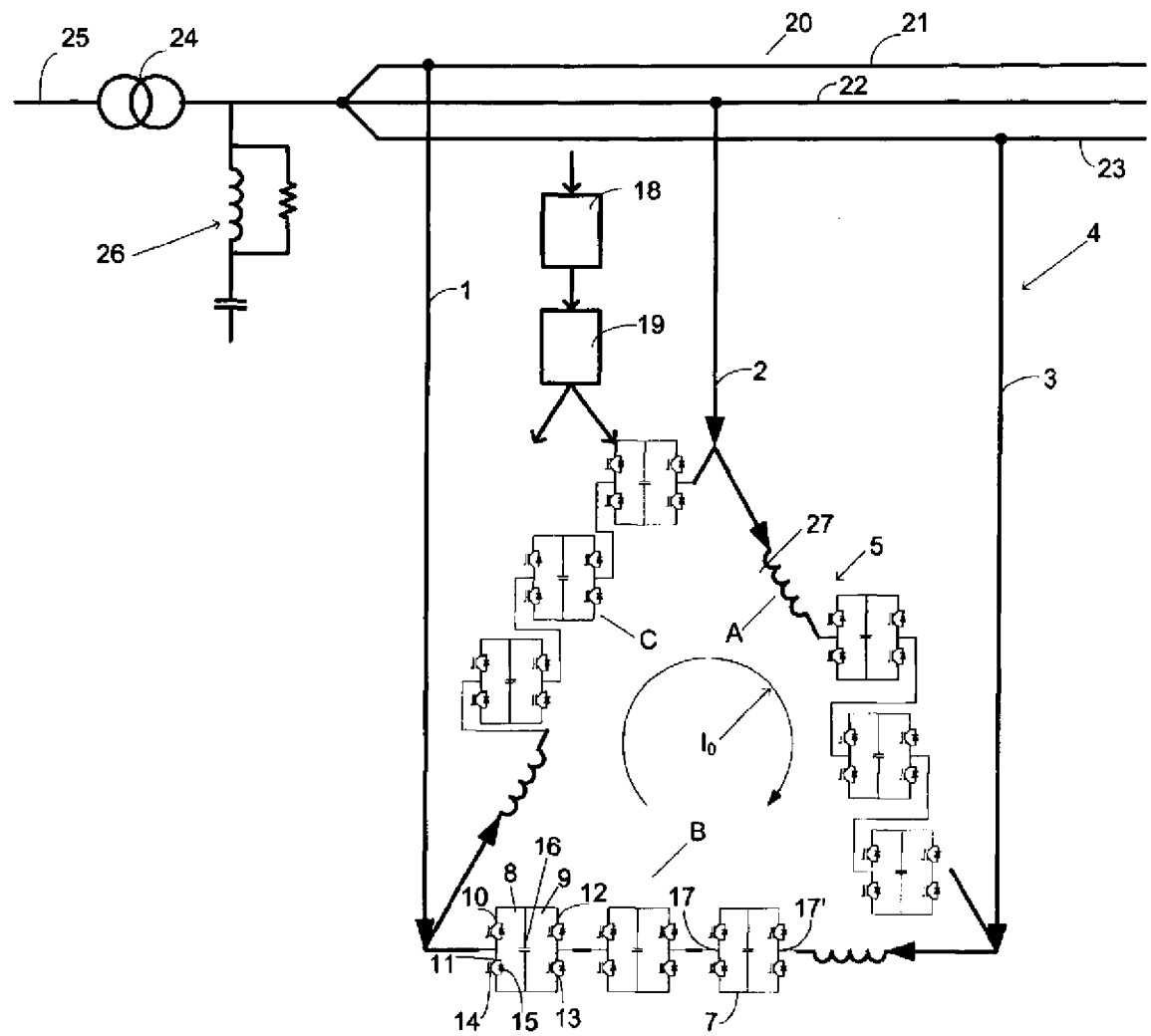

FIG. 2 shows an arrangement according to a second embodiment of the invention, which differs from the one according to FIG. 1 only by showing how the arrangement is in a particular case connected to a three phase power network 20 having three phases 21-23 feeding electric equipment, such as an arc furnace, which are through a transformer 24 connected to a high voltage electric power network 25, in which harmonic filters 26 are arranged at the connection of said power network 20 to the high voltage electric power network 25. The general function of the arrangement according to this embodiment will be the same as the one of the embodiment shown in FIG. 1, and the same reference numerals have for that sake been used in this Figure.

It is pointed out that although particular measures have been taken when designing the arrangement according to the invention for obtaining generation of a zero-sequence current circulating in the delta connection as well as negative-sequence current the arrangement may be used for other types of influences upon the properties of an electric power network, such as for reactive power compensation and for reducing harmonics in the electric power network, which may be generated by said load. The arrangements may for this sake also have reactive impedance elements connected in series with each phase leg of the converter, such as an inductor for reactive power consumption and a capacitor for reactive power generation, and such a reactive impedance element in the form of an inductor 27 is indicated in the Figures. This inductor may also function for smoothing the voltage generated by the converter.

The invention is of course not in any way restricted to the embodiments described above, but many possibilities to modifications thereof will be apparent to a person skilled in the art without departing from the scope of the invention as defined in the appended claims.

What is claimed is:

1. An arrangement for exchanging power, in shunt connection, with a three-phase electric power network, said arrangement comprising:
   a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding terminals of adjacent switching cells for forming said series connection of switching cells,
   in which the three phase legs of the Voltage Source Converter are interconnected by forming a delta-connection,
   means configured to detect electrical conditions of said three-phase electric power network and of said three phase legs of the Voltage Source Converter,
   a control unit configured to control said semiconductor devices of said semiconductor assemblies of each switching cell and by that each switching cell dependent upon information received from said detecting means to deliver a voltage across the terminals of each said switching cell being zero, +U or −U, in which U is the voltage across said capacitor, for together with other switching cells of the phase leg deliver a voltage pulse being the sum of the voltages so delivered by each switching cell,
   characterized in that said control unit is configured, upon receipt of information from said detecting means of an unbalance of the total direct voltage of each of said three phase legs with respect to the other two phase legs, to calculate a value for amplitude and phase position for a zero-sequence current ($I_0$) for which, when circulated in the delta-connection circuit of said three phase legs, the balance of the total direct voltage of each of said three phase legs with respect to the other two phase legs is restored and to control the semiconductor devices of said switching cells of the phase legs to add such a zero-sequence current to the currents of each phase leg of the converter.

2. The arrangement according to claim 1, characterized in that said control unit is configured to carry out said calculation of said zero-sequence current by utilizing a definition of the differential mode of said total direct voltages of said three phase legs as a vector being as follows:

$$\vec{U}_{Dc,Unb} = (2U_{DC,A} - U_{DC,B} - U_{DC,C})/3 + j*(U_{DC,B} - U_{DC,C})/\sqrt{3}$$

to calculate a zero-sequence current reference $\vec{I}_0$ to be added to a current reference for the control of said semiconductor devices of said switching cells as $\vec{I}_0 = R \vec{U}_{DC,Unb} * e^{j\omega t}$,
$U_{DC,A}$, $U_{DC,B}$, $U_{DC,C}$ being said total direct voltage of said phase legs A, B and C, respectively, and R being a control function with the dimension impedance$^{-1}$.

3. The arrangement according to claim 1, characterized in that said control unit is further configured, upon receipt of information from said detecting means causing a need to generate a negative-sequence current, to use this information when calculating a value for amplitude and phase position for said zero-sequence current, for which, when circulated in the delta-connection circuit of said three phase legs upon generation of said negative-sequence current, the resulting energy stored in said energy storing capacitors in each said phase leg will be constant in case of a said balance and to control the semiconductor devices of said switching cells of the phase legs to add such zero-sequence current to the currents of each phase leg of the converter.

4. The arrangement according to claim 1, characterized in that each phase leg of the Voltage Source Converter has a reactive impedance element connected in series therewith.

5. The arrangement according to claim 4, characterized in that said reactive impedance element comprises an inductor.

6. The arrangement according to claim 4, characterized in that said reactive impedance element comprises a capacitor.

7. The arrangement according to claim 1, characterized in that the number of switching cells in each phase leg of said Voltage Source Converter is $\geq 4$.

8. The arrangement according to claim 1, characterized in that said semiconductor devices of said semiconductor assemblies are IGBTs (Insulated Gate Bipolar Transistor), IGCTs (Integrated Gate Commutated Thyristor) or GTOs (Gate Turn-Off thyristor).

9. The arrangement according to claim 1, characterized in that said Voltage Source Converter has a capacity to together with said reactive impedance element connected in series therewith generate a voltage with a fundamental frequency being equal to the fundamental frequency of the voltage of the respective phase of the electric power network with an amplitude of 20 kV-500 kV.

10. The arrangement according to claim 1, characterized in that the control unit is configured to add a third harmonic current to the current reference when controlling said semiconductor devices.

11. A method of restoring a balance of the total direct voltage of each of three phase legs of a Voltage Source Converter with respect to the other two phase legs in an arrangement for exchanging power, in shunt connection, with a three-phase electric power network, in which said arrangement comprises:
   a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding terminals of adjacent switching cells for forming said series connection of switching cells,
   in which the three phase legs of the Voltage Source Converter are interconnected by forming a delta-connection, the method comprises the steps:
   detecting electrical conditions of said three-phase electric power network and of said three phase legs of the Voltage Source Converter, and
   controlling said semiconductor devices of said semiconductor assemblies of each switching cell and by that each switching cell dependent upon information from said detection to deliver a voltage across the terminals of each said switching cell being zero, +U or −U, in which U is the voltage across said capacitor, for together with other switching cells of the phase leg deliver a voltage pulse being the sum of the voltages so delivered by each switching cell, characterized in that it comprises the further steps:

calculating, upon detection of an unbalance of the total directed voltage of each of said three phase legs with respect to the other two phase legs, a value for amplitude and phase position for a zero-sequence current for which, when circulated in the delta-connection circuit of said three phase legs, the balance of the total direct voltage of each of said three phase legs with respect to the other two phase legs is a restored, and controlling the semiconductor devices of said switching cells of the phase legs to add such a zero-sequence current calculated to the currents of each phase leg of the converter.

12. The method according to claim 11, characterized in that said calculating is carried out by utilizing a definition of the differential mode of said total direct voltages of said three phase legs as a vector being as follows:

$$\vec{U}_{DC,Unb}=(2U_{DC,B}-U_{DC,C})/3+j*(U_{DC,B}-U_{DC,C})/\sqrt{3}$$

to calculate a zero-sequence current reference $\vec{I}_0$ to be added to a current reference for the control of said semiconductor devices of said switching cells as $\vec{I}_0 = R \vec{U}_{DC,Unb} * e^{j\omega t}$, $U_{DC,A}$, $U_{DC,Bc}$, $U_{DC,C}$ being said total direct voltage of said phase legs respectively, and R being a control function with the dimension impedance$^{-1}$.

13. The method according to claim 11, characterized in that in said step of calculating, upon detection of a need to generate a negative-sequence current, this information is used when calculating a value for amplitude and phase position for said zero-sequence current, for which, when circulated in the delta-connection circuit of said three phase legs upon generation of said negative-sequence current, the resulting energy stored in said energy storing capacitors in each said phase leg will be constant in case of a said balance, and that when controlling said semiconductor devices of switching cells of the phase legs this is done so as to add such zero-sequence current to the currents of each phase leg of the converter.

14. A use of an arrangement for exchanging power with a three-phase electric power network, said arrangement comprising:

a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding terminals of adjacent switching cells for forming said series connection of switching cells, in which the three phase legs of the Voltage Source Converter are interconnected by forming a delta-connection, means configured to detect electrical conditions of said three-phase electric power network and of said three phase legs of the Voltage Source Converter, a control unit configured to control said semiconductor devices of said semiconductor assemblies of each switching cell and by that each switching cell dependent upon information received from said detecting means to deliver a voltage across the terminals of each said switching cell being zero, +U or −U, in which U is the voltage across said capacitor, for together with other switching cells of the phase leg deliver a voltage pulse being the sum of the voltages so delivered by each switching cell, characterized in that said control unit is configured, upon receipt of information from said detecting means of an unbalance of the total direct voltage of each of said three phase legs with respect to the other two phase legs, to calculate a value for amplitude and phase position for a zero-sequence current ($I_0$) for which, when circulated in the delta-connection circuit of said three phase legs, the balance of the total direct voltage of each of said three phase legs with respect to the other two phase legs is restored and to control the semiconductor devices of said switching cells of the phase legs to add such a zero-sequence current to the currents of each phase leg of the converter.

15. The use according to claim 14, in which said power network is feeding an industrial arc furnace and typically carries a voltage of 36 kV.

16. The use according to claim 14 for exchanging power with a three-phase electric power network in the form of a high-voltage transmission line, which typically carries a voltage of 132-500 kV.

\* \* \* \* \*

UNITED STATES PATENT AND TRADEMARK OFFICE
CERTIFICATE OF CORRECTION

| | |
|---|---|
| PATENT NO. | : 8,259,480 B2 |
| APPLICATION NO. | : 13/330337 |
| DATED | : September 4, 2012 |
| INVENTOR(S) | : Jean-Philippe Hasler |

It is certified that error appears in the above-identified patent and that said Letters Patent is hereby corrected as shown below:

The attached sheets 1-2 of drawings include Figures 1-2 originally filed on December 19, 2011 with the above Patent Application. These sheets replace the poor quality Figures 1-2 which were erroneously published with the granted patent.

Signed and Sealed this
Eighteenth Day of December, 2012

David J. Kappos
*Director of the United States Patent and Trademark Office*